(12) United States Patent
Wallace et al.

(10) Patent No.: US 8,931,834 B2
(45) Date of Patent: Jan. 13, 2015

(54) ARMREST ASSEMBLY WITH DEPLOYABLE BED EXTENSION

(71) Applicant: B/E Aerospace, Inc., Wellington, FL (US)

(72) Inventors: Andrew Gordon Wallace, Nr. Newant (GB); Paul Benedict Rutter, Warick (GB); Alexander Nicholas Pozzi, Winston-Salem, NC (US)

(73) Assignee: B/E Aerospace, Inc., Wellington, FL (US)

( * ) Notice: Subject to any disclaimer, the term of this patent is extended or adjusted under 35 U.S.C. 154(b) by 128 days.

(21) Appl. No.: 13/803,012

(22) Filed: Mar. 14, 2013

(65) Prior Publication Data

US 2013/0241258 A1    Sep. 19, 2013

Related U.S. Application Data

(60) Provisional application No. 61/610,547, filed on Mar. 14, 2012.

(51) Int. Cl.
*B60N 2/34* (2006.01)
*B64D 11/06* (2006.01)
*A47C 17/12* (2006.01)
*B60N 2/46* (2006.01)

(52) U.S. Cl.
CPC ............... *A47C 17/12* (2013.01); *B64D 11/06* (2013.01); *B60N 2/464* (2013.01); *B60N 2/34* (2013.01); *B60N 2/4606* (2013.01); *B64D 2011/0613* (2013.01); *B64D 2011/062* (2013.01)
USPC ................... 297/118; 297/354.13; 244/118.6

(58) Field of Classification Search
CPC ........ B60N 2/34; B60N 2/4606; A47C 17/12; A47C 17/16; A47C 17/17
USPC ............... 297/118, 115, 411.36, 354.13, 342; 244/118.6
See application file for complete search history.

(56) References Cited

U.S. PATENT DOCUMENTS

| | | | |
|---|---|---|---|
| 7,517,010 B2 * | 4/2009 | Saint-Jalmes et al. | 297/118 |
| 8,011,723 B2 * | 9/2011 | Park et al. | 297/118 |
| 8,690,254 B2 * | 4/2014 | Cailleteau | 297/411.36 |
| 2005/0067870 A1 * | 3/2005 | Rezag et al. | 297/354.13 |
| 2006/0219843 A1 * | 10/2006 | Martin | 244/118.6 |
| 2010/0193634 A1 * | 8/2010 | Hankinson et al. | 244/118.6 |
| 2013/0313866 A1 * | 11/2013 | Dryburgh et al. | 297/68 |

FOREIGN PATENT DOCUMENTS

DE    102009033798 A1 *  9/2010

* cited by examiner

*Primary Examiner* — Milton Nelson, Jr.
(74) *Attorney, Agent, or Firm* — Shumaker, Loop & Kendrick

(57) ABSTRACT

An armrest assembly for a seat of the type that is convertible into a lie flat bed, the armrest assembly including an armrest, an armrest housing in which the armrest is mounted for vertical movement, and a planar bed extension having an upper bed surface is mounted in the armrest housing for movement between a stowed position wherein the bed extension is contained in a vertical position in the armrest housing and a deployed position wherein the bed extension is positioned exterior to the armrest housing in a raised, horizontal position, wherein the armrest and bed extension reside in horizontal alignment with a seat back and seat bottom of the seat to collectively define a portion of a bed.

18 Claims, 8 Drawing Sheets

ARMREST ASSEMBLY WITH DEPLOYABLE BED EXTENSION

CROSS-REFERENCE TO RELATED APPLICATIONS

This application claims priority to U.S. Application No. 61/610,547 filed Mar. 14, 2012, the contents of which are incorporated by reference herein.

TECHNICAL FIELD AND BACKGROUND OF THE INVENTION

This invention relates to an armrest assembly of a passenger seat that includes a manual mechanism by which a bed extension can be deployed to increase the bed size of a lie flat seat of the type found in first class cabins of passenger aircraft. The deployment of the bed extension is manually operated by the armrest movement. The bed extension cooperates with other bed elements that are deployed to convert a seating area into a sleeping area. Such bed elements collectively make into a bed of sufficient length to allow a passenger to recline into an essentially lie flat position. When the passenger is ready to resume sitting, the process is reversed, and the portion of the bed surface formed by the upper surface of the armrest reverts to use as an armrest.

SUMMARY OF THE INVENTION

It is therefore an object of the invention to provide a manual mechanism by which a bed extension can be deployed to increase the bed size of a lie flat seat of the type found in first class cabins of passenger aircraft.

It is another object of the invention to provide an armrest for a lie flat seat of the type found in cabins of passenger aircraft that is vertically moveable between an armrest position adjacent a seating surface of the lie flat seat and a bed position wherein the armrest is moved vertically-downward to form part of a support surface of a bed.

It is another object of the invention to provide an armrest for a lie flat seat of the type found in cabins of passenger aircraft that is vertically moveable between an armrest position adjacent a seating surface of the lie flat seat and a bed position wherein the armrest is moved vertically-downward to form part of a support surface of a bed in combination with a manual mechanism by which a bed extension can be deployed to increase the bed size of a lie flat seat of the type found in first class cabins of passenger aircraft.

These and other objects and advantages of the present invention are achieved in the preferred embodiment disclosed below by providing an armrest assembly of a seat of the type that is convertible into a lie flat bed. An armrest assembly is provided that includes an armrest and an armrest housing in which the armrest is mounted for movement between an upper horizontal armrest position and a lower horizontal bed position. A planar bed extension having an upper bed surface is mounted in the armrest housing for movement between a stowed position. The bed extension is stowed in a vertical position in the armrest housing and moves to a deployed position wherein the bed extension is positioned exterior to the armrest housing in a raised, horizontal position with the bed surface in horizontal alignment with the upper horizontal surface of the armrest. The armrest and bed extension is adapted to reside in horizontal alignment with a seat back and seat bottom of a lie flat seat to collectively define a portion of a bed.

In accordance with another embodiment of the invention, the bed extension may be mounted for movement on a horizontal linear slide by which the bed extension is ejected out of a front opening of the armrest for deployment.

In accordance with another embodiment of the invention, an interconnection between the armrest and the bed extension may first deploy the bed extension from the armrest housing, and thereafter may move the armrest from the upper position to the lower position.

In accordance with another embodiment of the invention, a spring motor may be carried in the armrest housing for driving the deployment of the bed extension.

In accordance with another embodiment of the invention, a spring motor may be carried in the armrest housing for driving the movement of the armrest from the lower bed position to the upper armrest position.

In accordance with another embodiment of the invention, the bed extension may be deployed from the armrest housing by a spring motor which is charged in the stowed position and releases to drive the bed extension out of the armrest housing.

In accordance with another embodiment of the invention, the motion of the bed extension may be guided by a horizontal linear slide and speed-controlled by a statically-mounted rotary damper/speed controller.

In accordance with another embodiment of the invention, an interconnection between the armrest and the bed extension may first deploy the bed extension from the armrest housing, and thereafter may move the armrest from the upper position to the lower position, and the movement of the armrest from the upper position to the lower position may cause the bed extension to rotate from a vertical position to the raised, horizontal position with the bed surface in horizontal alignment with the upper horizontal surface of the armrest.

In accordance with another embodiment of the invention, the bed extension may be supported by a cantilever positioned in a coplanar position with the upper bed surface of the bed extension when stowed, and positioned at an oblique angle in a support position under the bed extension when deployed.

In accordance with another embodiment of the invention, a seat is provided of the type that is convertible into a lie flat bed, and includes a seat back and seat bottom that are movable between seating and lie flat sleeping positions. A first armrest assembly is mounted on a first lateral side of the seat, and includes an armrest and an armrest housing in which the armrest is mounted for movement between an upper horizontal armrest position and a lower horizontal bed position. A planar bed extension is provided having an upper bed surface, and is mounted in the armrest housing for movement between a stowed position wherein the bed extension is contained in a vertical position in the armrest housing and a deployed position wherein the bed extension is positioned exterior to the armrest housing in a raised, horizontal position with the bed surface in horizontal alignment with the upper horizontal surface of the armrest. The armrest and bed extension of the first armrest assembly is adapted to reside in horizontal alignment with the seat back and seat bottom of the lie flat seat to collectively a portion of the bed. A second armrest assembly is mounted on a second lateral side of the seat, and includes an armrest and an armrest housing in which the armrest is mounted for movement between an upper horizontal armrest position and a lower horizontal bed position. The armrest of the second armrest assembly is adapted to reside in horizontal alignment with the seat back and seat bottom of the lie flat seat on the second lateral side of the seat to define a portion of the bed.

The embodiments disclosed herein may include one or more or a combination of the above features and aspects.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENT AND BEST MODE

Figure 1:
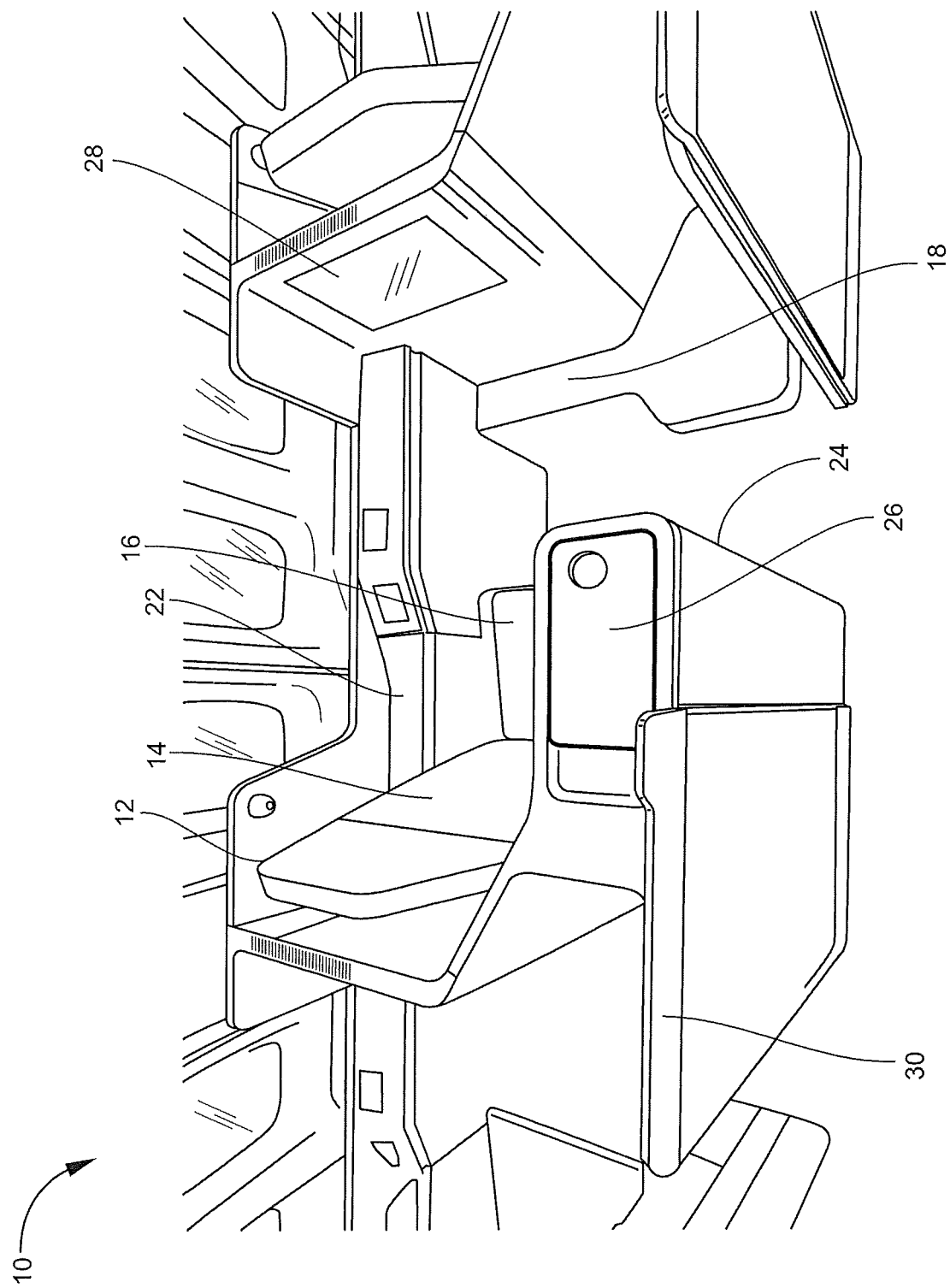
FIG. 1 is an overhead, oblique view of a seat according to a preferred embodiment of the invention.
Figure 2:
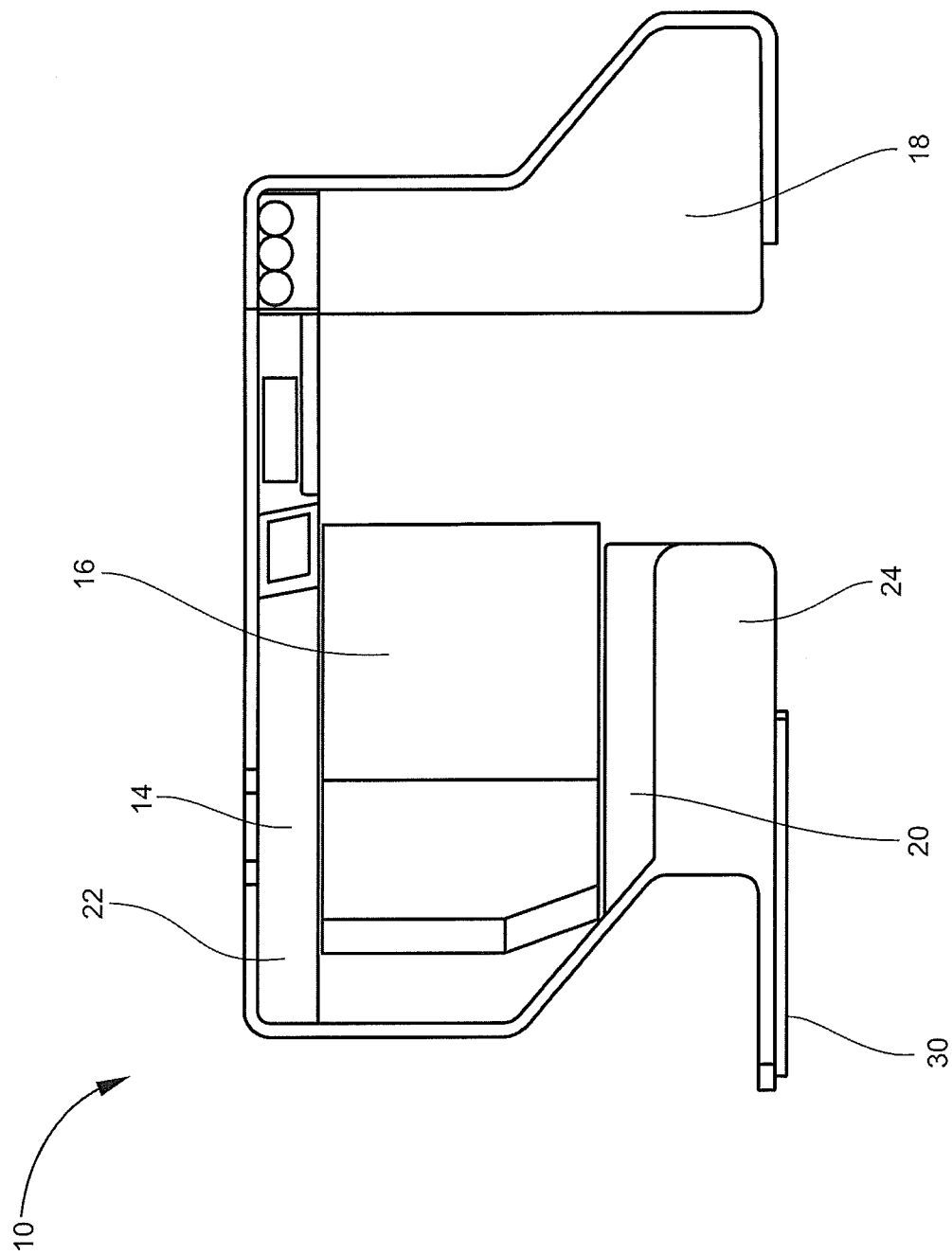
FIG. 2 is a top plan view of the seat illustrated in FIG. 1.

Referring now to the drawings, a suite 10 is shown and includes in its seating orientation shown in FIGS. 1 and 2, an aisle side opening closet 24, sliding privacy screen 30, retracting table 26, wide-screen display monitor 28, ottoman 18 and seat 12, which includes a seat back 14, a seat bottom 16 and left and right armrest assemblies 22, 20. The entire suite 10 is substantially enclosed by one or more privacy panels that cooperate with the sliding privacy screen 30 to provide the seat occupant the desired degree of privacy.

In the seating configuration, the seat 12 provides a seating pitch of about 1.6 meters with the unit oriented generally along the longitudinal axis of the aircraft. This permits a conventional front-facing seating orientation that allows window viewing.

Figure 3:
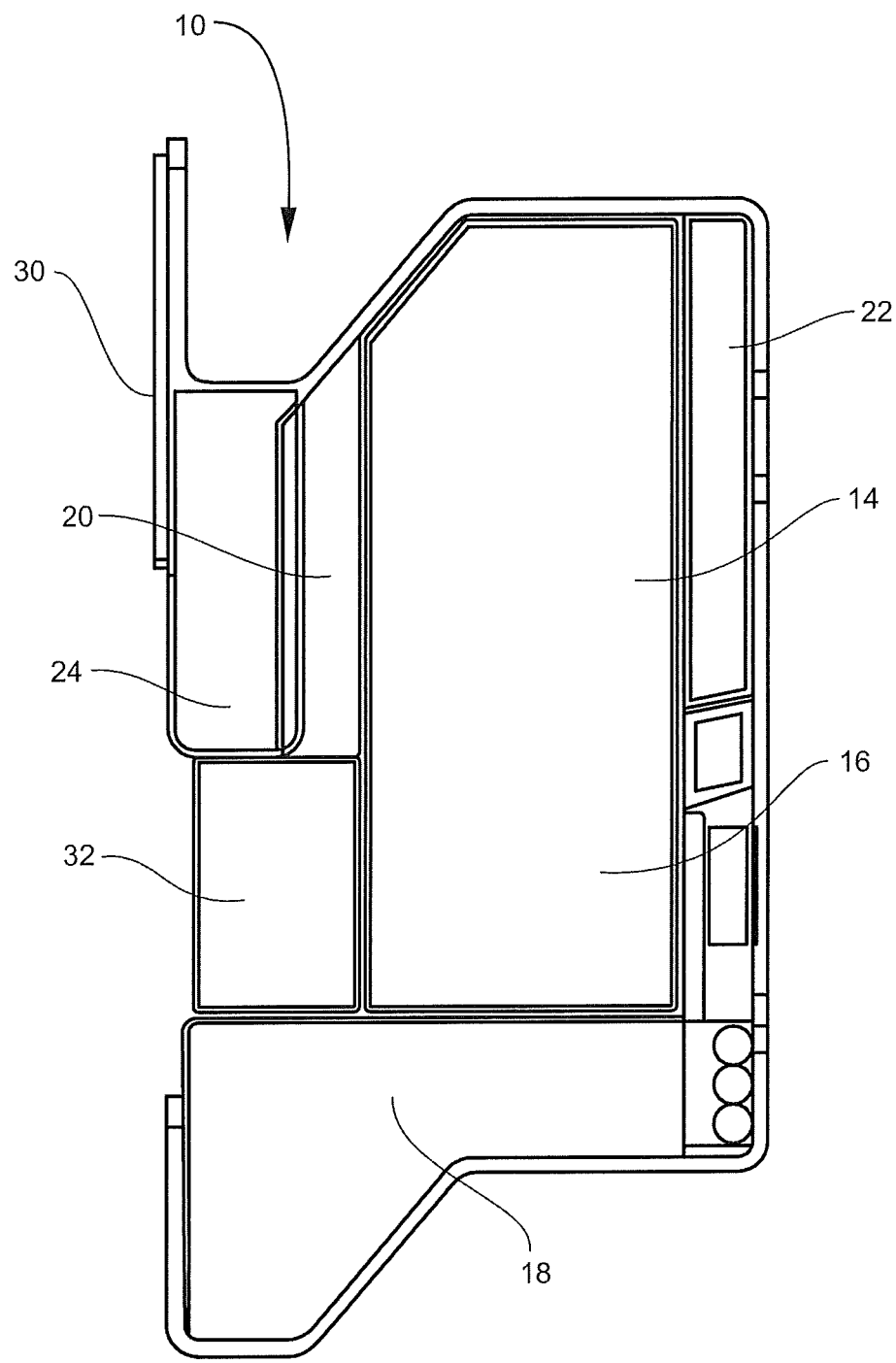
FIG. 3 is another top plan view of the seat illustrated in FIG. 1 in a seating configuration.
Figure 4:
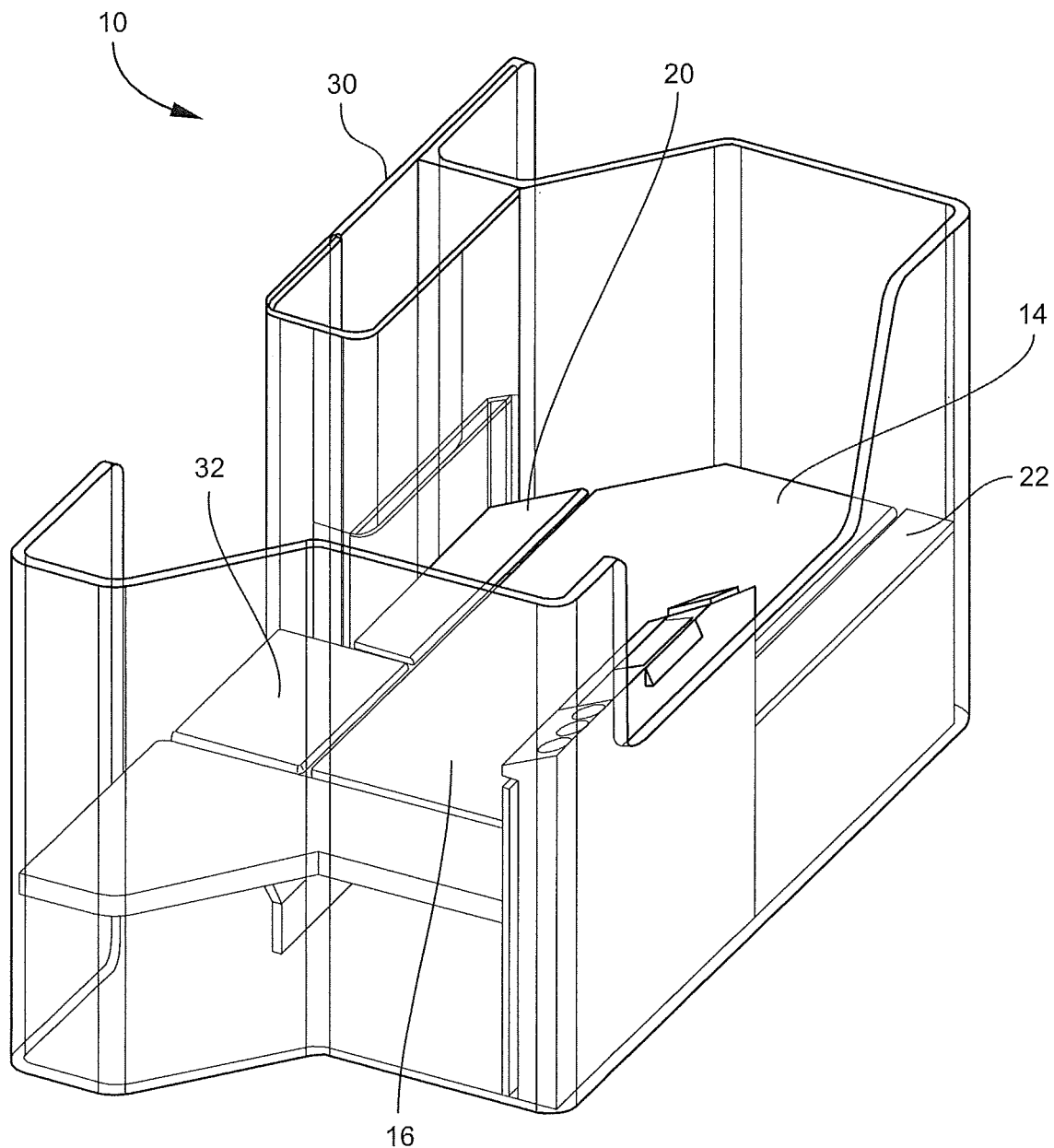
FIG. 4 is a perspective view of the seat illustrated in FIG. 1 in a lie flat sleeping configuration with forward areas shown in transparent view to illustrate seating elements otherwise hidden from view.
Figure 5:
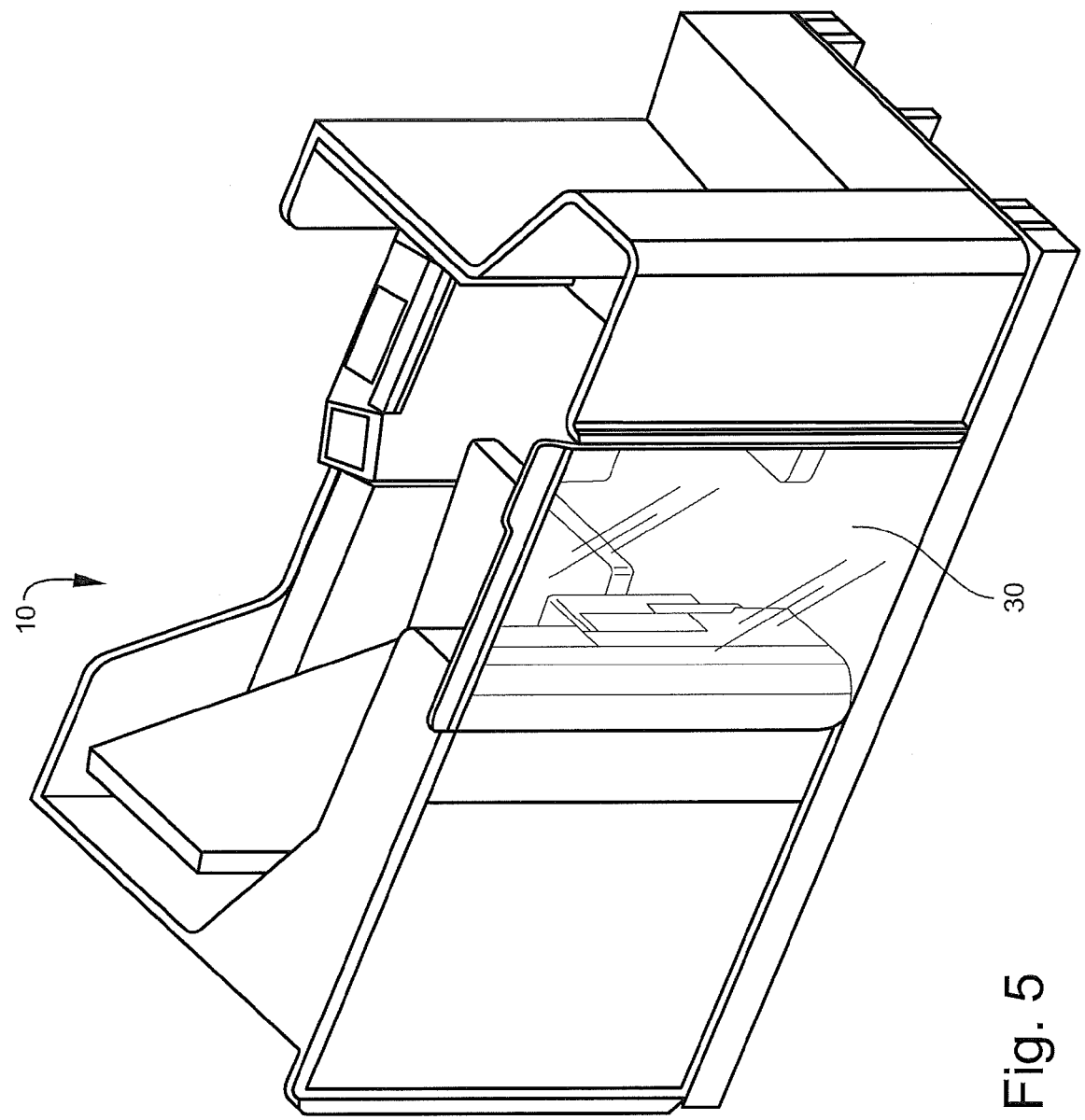
FIG. 5 is a perspective view of the seat illustrated in FIG. 1 in a seating configuration with the privacy screen in the closed position.

As is shown in FIGS. 3 and 4, the seat 12 converts from the seating configuration shown in FIGS. 1 and 2 into a sleeping configuration by reclining the seat back 14 and seat bottom 16 to provide a significantly greater length dimension that permits even a relatively tall passenger to lie in a fully reclined position. As shown and described further below, the seating elements reconfigure into a bed having a configuration collectively formed of the seat back 14, seat bottom 16, armrest assemblies 20, 22, ottoman 18 and a bed extension 32 that provides about a 2.1 meter recline length while increasing the full seat width except in the head and foot areas where less width is needed. This is accomplished by lowering the armrest assemblies 20, 22 to the same level as the reclined seat back 14 and seat bottom 16. The bed extension 32 is stowed in the right armrest assembly 20 in the seating orientation and extends outward and upward to provide additional width in the torso and upper leg areas of the bed. See FIG. 3. The reconfiguration between seating and sleeping positions can be accomplished quickly and without disturbing adjacent passengers. The seating and sleeping positions are completely independent seat to seat, so that any combination of passengers can be traveling in either the seating position or in the sleeping position. Also, greater utilization of space can be achieved with all passengers seated in the forward-facing direction in contrast to many previous configurations where increased space utilization is achieved by alternating seat-facing direction. As shown in FIG. 5, the privacy screen 30 can be slid towards the ottoman end of the seat 12 to provide additional privacy to the passenger in either the seated position, shown, or the sleeping position, not shown.

Referring now to FIGS. 6-10 of the drawings, the armrest assembly 20 has an armrest 34 that, in the seating configuration, serves the usual purpose of providing a rest on which the passenger can place an arm. The armrest assembly 20 includes an armrest housing 40 into and out of which the armrest assembly is adapted to vertically move, as described in further detail below. The armrest 34 is mounted on vertical slide rails 42, 44. A cable pulley 46 guides a counterbalance cable. A speed controller rack 50 prevents excessively-rapid deployment, and a horizontal linear slide 52 provides the means by which the bed extension 32 is ejected out of the front of the armrest housing 40.

A push button control 54 on the top of the armrest assembly 20 is depressed to deploy the bed extension 32. The armrest assembly 20 also includes a rotary damper/speed controller 56, horizontal slider final damper and end stop 58, a vertical slider counter balance spring 60 and a horizontal slider spring motor 62.

The deployment of the bed extension 32 is manually operated by movement of the armrest assembly 20. To begin deployment, the passenger or flight attendant depresses the push button control 54 in the armrest 34 which releases a latch on the bed extension 32. The bed extension 32 is then driven forward by means of the spring motor 62, which is charged in the stowed position and releases to drive the bed extension 32 out of the armrest housing 40. The motion of the bed extension 32 is guided by the horizontal linear slide 52 and speed-controlled by the statically-mounted rotary damper/speed controller 56, which connected to the sliding bed extension 32 via the cable pulley 46 and the horizontal speed controller rack 50 on the underside of the mechanism.

Figure 7:
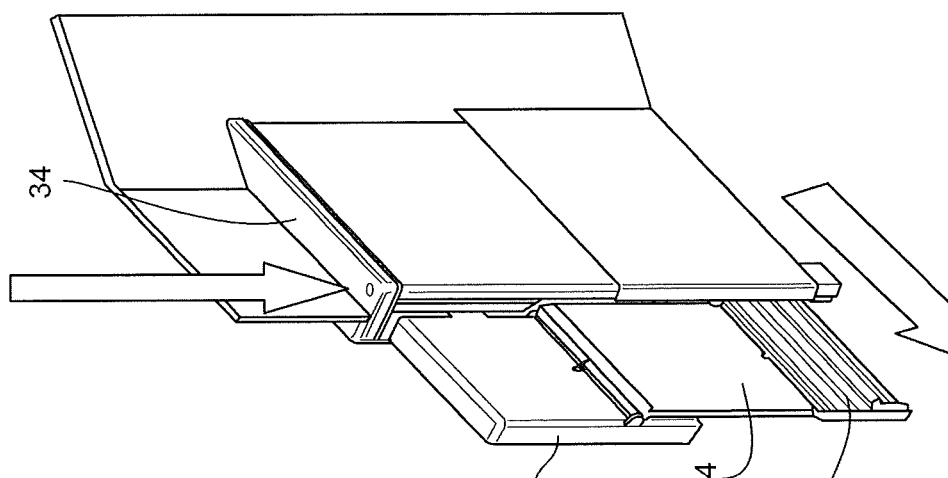
FIG. 7 is a simplified view of the armrest from the seat side showing the bed extension in its initial position as it is ejected in a vertical position from the right hand armrest.
Figure 6:
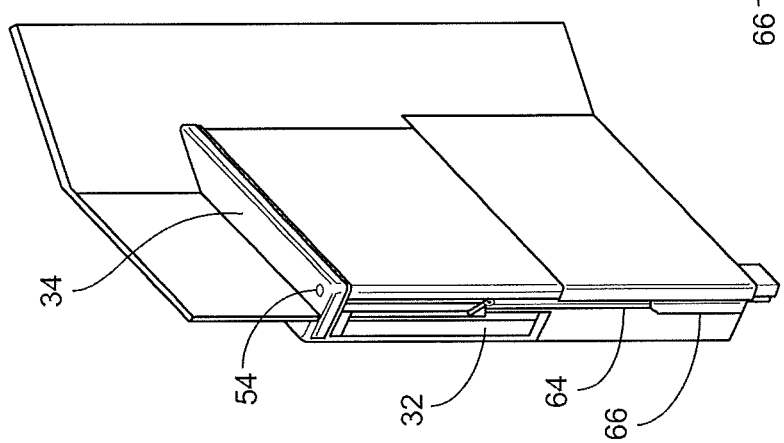
FIG. 6 is a simplified view of the armrest from the seat side showing the bed extension in its stowed position within a right hand armrest.
Figure 9:
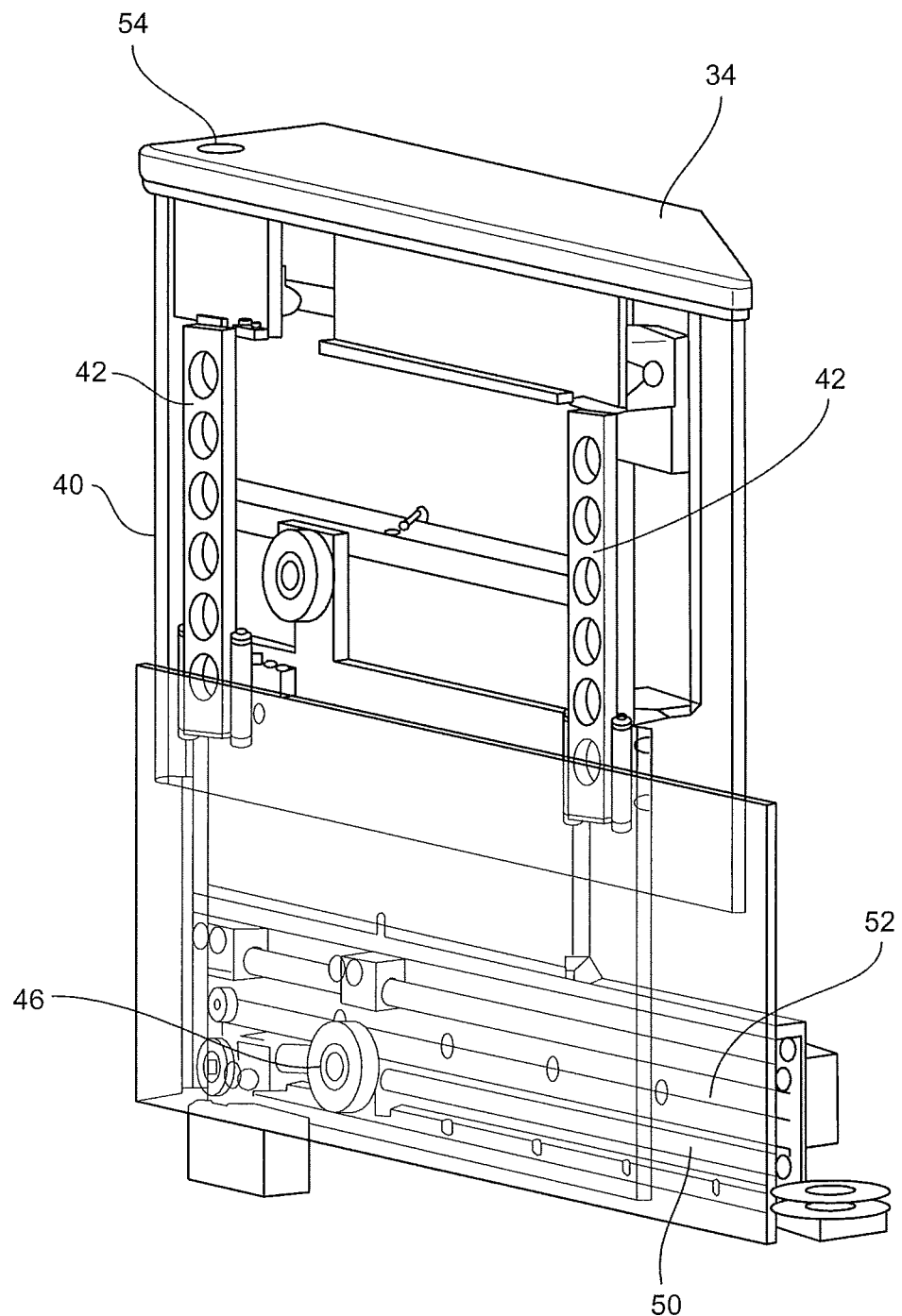
FIG. 9 is a side elevation with parts broken away for clarity of an armrest portion of a seating assembly, viewed from the seat side.
Figure 10:
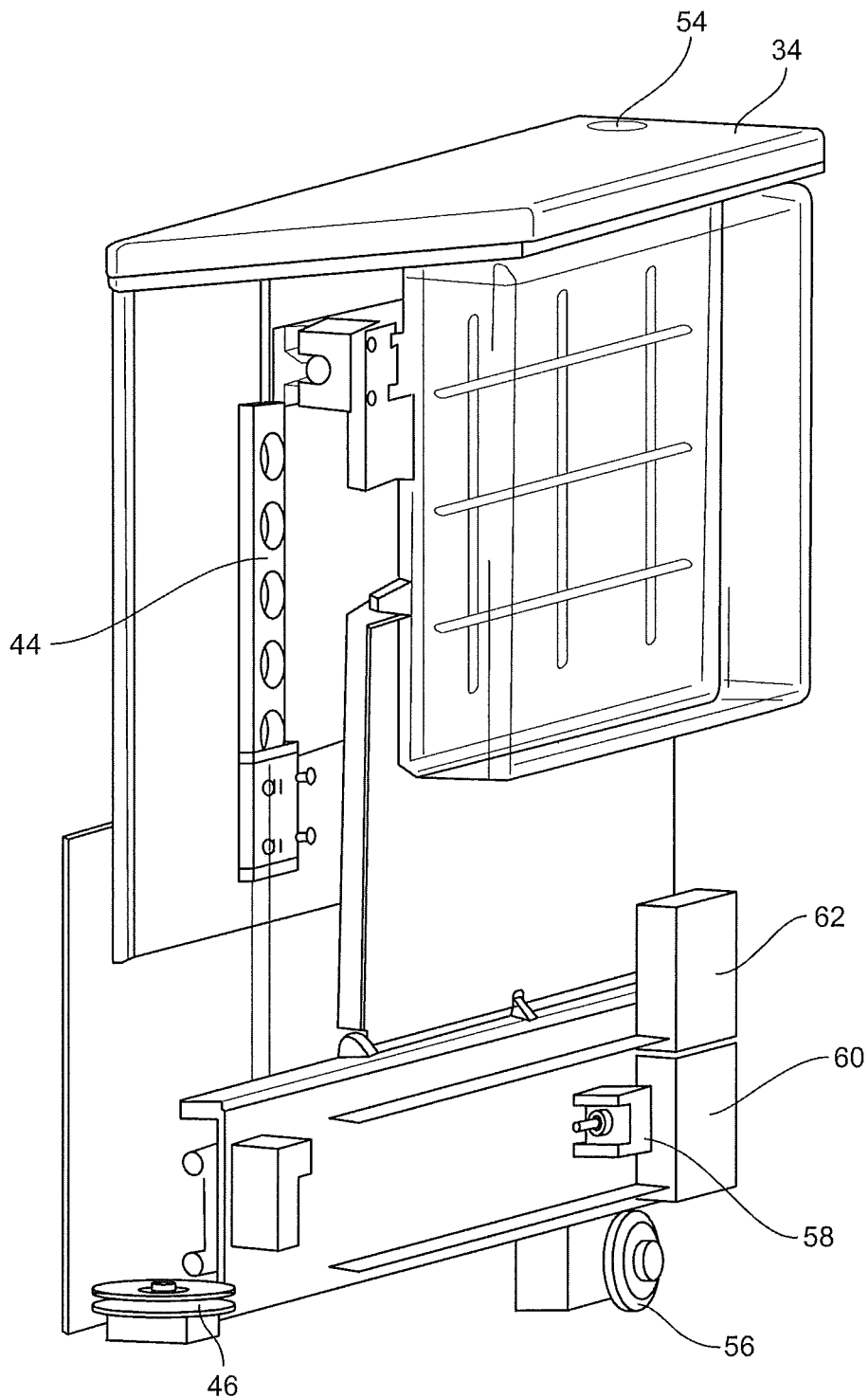
FIG. 10 is a side elevation with parts broken away for clarity of an armrest portion of a seating assembly, viewed from the aisle side.

Once the horizontal deployment of the bed extension 32 is complete, as shown in FIG. 7, the armrest 34 is unlocked automatically, allowing it to be pushed vertically downwards, until it latches in the fully down position. This action charges the vertical slider counter balance spring 60 which acts as a counter balance and is later used to return the armrest 34 to its upper position when the down latch is released.

Figure 8:
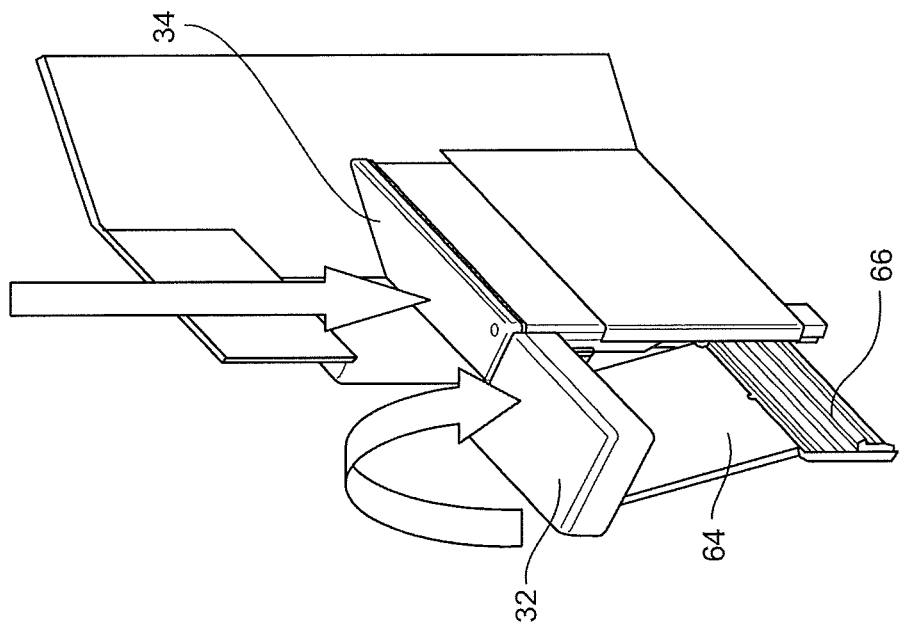
FIG. 8 is a simplified view of the armrest from the seat side showing the bed extension in its deployed position adjacent to and at the same horizontal level as the right hand armrest.

The downward motion of the armrest 34 into the armrest housing 40 also causes the bed extension 32 to rotate from the vertical to the horizontal orientation. See FIG. 8. This is achieved by virtue of a hinged cantilever 64 that joins the bed extension 32 to a horizontal sliding carriage 66. As the armrest 34 moves down it forces the bed extension 32 downwards as they are connected together by a slide rail and bearing arrangement. As it is driven downwards, the bed extension 32 is forced to rotate on bearings about the sliding carriage 66 by the geometry of the cantilever 64. The rotation ends once the bed extension is positioned in horizontal alignment with the armrest 34. As shown in FIG. 8, the cantilever 64 extends diagonally outward to support the outer edge of the bed extension 32.

In addition, the downward motion of the armrest 34 may drive a support peg, not shown, out from under the ottoman 18 via a cable drive arrangement. This support peg extends under the cantilevered bed extension 32, providing extra support.

To stow the bed extension 32, the armrest latch is released so that the armrest 34 is driven back to its uppermost position by the vertical slider counter balance spring 60. In so doing, it also retracts the support peg and rotates the bed extension 32 back into a vertical orientation. Finally, the passenger or flight attendant manually slides the bed extension 32 back into the armrest housing 40 until it latches, recharging the vertical slider counter balance spring 60.

While the invention has been described with reference to armrest assembly 20 the left armrest 22 may be provided with the same armrest functions and mechanisms as described above and can be deployed in addition to or instead of the armrest assembly 20. See FIGS. 3 and 4. Note that the armrest assembly 22 does not include the bed extension 32 that operates together with the armrest 22. The bed extension 32 functions to fill the gap between the closet 24 and ottoman 18, which is not present on the left hand side of the seat 12 It should be understood that the deployable bed extension may be provided in one or more of the left and right hand armrest assemblies depending on the suite arrangement and gaps to be 'filled'.

An armrest assembly for a lie flat seat is described above. Various details of the invention may be changed without departing from its scope. Furthermore, the foregoing description of the preferred embodiment of the invention and the best mode for practicing the invention are provided for the purpose of illustration only and not for the purpose of limitation, the invention being defined by the claims.

What is claimed is:

1. An armrest assembly of a seat of a type that is convertible into a lie flat bed, comprising:
   (a) an armrest assembly that includes an armrest and an armrest housing in which the armrest is mounted for movement between an upper horizontal armrest position and a lower horizontal bed position;
   (b) a planar bed extension having an upper bed surface, and mounted in the armrest housing for movement between a stowed position wherein the bed extension is contained in a vertical position in the armrest housing and a deployed position wherein the bed extension is positioned exterior to the armrest housing in a raised, horizontal position with the bed surface in horizontal alignment with an upper horizontal surface of the armrest; and
   (c) the armrest and bed extension adapted to reside in horizontal alignment with a seat back and seat bottom of a lie flat seat to collectively define a portion of a bed.

2. The armrest assembly according to claim 1, wherein the bed extension is mounted for movement on a horizontal linear slide by which the bed extension is ejected out of a front opening of the armrest housing for deployment.

3. The armrest assembly according to claim 1, wherein an interconnection between the armrest and the bed extension first deploys the bed extension from the armrest housing, and thereafter moves the armrest from the upper horizontal armrest position to the lower horizontal bed position.

4. The armrest assembly according to claim 1, further comprising a spring motor carried in the armrest housing for driving the deployment of the bed extension.

5. The armrest assembly according to claim 1, further comprising a spring motor carried in the armrest housing for driving the movement of the armrest from the lower horizontal bed position to the upper horizontal armrest position.

6. The armrest assembly according to claim 1, wherein the bed extension is deployed from the armrest housing by a spring motor that is charged in the stowed position and releases to drive the bed extension out of the armrest housing.

7. The armrest assembly according to claim 6, wherein motion of the bed extension is guided by a horizontal linear slide and speed-controlled by a statically-mounted rotary damper/speed controller.

8. The armrest assembly according to claim 1, wherein:
   (a) an interconnection between the armrest and the bed extension first deploys the bed extension from the armrest housing, and thereafter moves the armrest from the upper horizontal armrest position to the lower horizontal bed position; and
   (b) the movement of the armrest from the upper horizontal armrest position to the lower horizontal bed position causes the bed extension to rotate from the vertical position to the raised, horizontal position with the bed surface in horizontal alignment with the upper horizontal surface of the armrest.

9. The armrest assembly according to claim 8, wherein the bed extension is supported by a cantilever positioned in a coplanar position with an upper bed surface of the bed extension when stowed, and positioned at an oblique angle in a support position under the bed extension when deployed.

10. A seat of a type that is convertible into a lie flat bed, comprising:
    (a) a seat back and seat bottom that are movable between seating and lie flat sleeping positions;
    (b) a first armrest assembly mounted on a first lateral side of the seat, and including:
       (i) an armrest and an armrest housing in which the armrest is mounted for movement between an upper horizontal armrest position and a lower horizontal bed position;
       (ii) a planar bed extension having an upper bed surface, and mounted in the armrest housing for movement between a stowed position wherein the bed extension is contained in a vertical position in the armrest housing and a deployed position wherein the bed extension is positioned exterior to the armrest housing in a raised, horizontal position with the bed surface in horizontal alignment with an upper horizontal surface of the armrest;
       (iii) the armrest and bed extension of the first armrest assembly adapted to reside in horizontal alignment with the seat back and seat bottom of a lie flat seat to collectively define a portion of the bed;
    (c) a second armrest assembly mounted on a second lateral side of the seat, and that includes:
       (i) an armrest and an armrest housing in which the armrest is mounted for movement between an upper horizontal armrest position and a lower horizontal bed position; and
       (ii) the armrest of the second armrest assembly adapted to reside in horizontal alignment with the seat back and seat bottom of the lie flat seat on the second lateral side of the seat to define a portion of the bed.

11. The seat according to claim 10, wherein the bed extension of the first armrest assembly is mounted for movement on a horizontal linear slide by which the bed extension is ejected out of a front opening of the armrest housing for deployment.

12. The seat according to claim 10, wherein an interconnection between the armrest and the bed extension of the first armrest assembly first deploys the bed extension from the armrest housing, and thereafter moves the armrest from the upper horizontal armrest position to the lower horizontal bed position.

13. The seat according to claim 10, wherein the first armrest assembly includes a spring motor carried in the first armrest housing for driving the deployment of the bed extension.

14. The seat according to claim 10, further comprising a spring motor carried in the armrest housing of the first and second armrest assemblies for driving the movement of the respective armrests from the lower horizontal bed position to the upper horizontal armrest position.

15. The seat according to claim 10, wherein the bed extension deploys from the armrest housing by a spring motor that is charged in the stowed position and released to drive the bed extension out of the armrest housing.

16. The seat according to claim 15, wherein motion of the bed extension is guided by a horizontal linear slide and speed-controlled by a statically-mounted rotary damper/speed controller.

17. The seat according to claim 10, wherein:
  (a) an interconnection between the armrest and the bed extension first deploys the bed extension from the armrest housing of the first armrest assembly, and thereafter moves the armrest from the upper horizontal armrest position to the lower horizontal bed position; and
  (b) the movement of the armrest from the upper horizontal armrest position to the lower horizontal bed position causes the bed extension to rotate from a vertical position to the raised, horizontal position with the bed surface in horizontal alignment with an upper horizontal surface of the armrest.

18. The seat according to claim 17, wherein the bed extension is supported by a cantilever positioned in a coplanar position with the upper bed surface of the bed extension when stowed, and is positioned at an oblique angle in a support position under the bed extension when deployed.

\* \* \* \* \*